US010657512B2

(12) United States Patent
Patwardhan et al.

(10) Patent No.: US 10,657,512 B2
(45) Date of Patent: May 19, 2020

(54) MULTI-USE NEAR FIELD COMMUNICATION FRONT END ON A POINT OF SALE SYSTEM

(71) Applicant: Clover Network, Inc., Sunnyvale, CA (US)

(72) Inventors: Ketan Patwardhan, Sunnyvale, CA (US); Narayanan Gopalakrishnan, Newark, CA (US); Victor Pan, Fremont, CA (US); James Castillo, Mountain House, CA (US)

(73) Assignee: Clover Network, Inc., Sunnyvale, CA (US)

( * ) Notice: Subject to any disclaimer, the term of this patent is extended or adjusted under 35 U.S.C. 154(b) by 0 days.

(21) Appl. No.: 16/442,210

(22) Filed: Jun. 14, 2019

(65) Prior Publication Data

US 2019/0295060 A1 Sep. 26, 2019

Related U.S. Application Data

(63) Continuation-in-part of application No. 15/698,462, filed on Sep. 7, 2017, now Pat. No. 10,332,093.

(51) Int. Cl.
*G06Q 20/00* (2012.01)
*G06Q 40/00* (2012.01)
(Continued)

(52) U.S. Cl.
CPC ....... *G06Q 20/202* (2013.01); *G06K 7/10237* (2013.01); *G06Q 20/204* (2013.01)

(58) Field of Classification Search
None
See application file for complete search history.

(56) References Cited

U.S. PATENT DOCUMENTS

| 8,924,260 B1 | 12/2014 | Priebatsch |
| 9,369,431 B1 * | 6/2016 | Kirby .................... H04L 63/02 |

(Continued)

FOREIGN PATENT DOCUMENTS

CN  201681407 U  12/2010

OTHER PUBLICATIONS

Extended European Search Report for EP Patent Application No. 18193126.2, dated Nov. 14, 2018.
(Continued)

*Primary Examiner* — Ariel J Yu
(74) *Attorney, Agent, or Firm* — Daylight Law, P.C.

(57) ABSTRACT

Methods and systems related to near field communication (NFC) front ends for point of sale terminals are disclosed. One point of sale system includes an applications microprocessor programmed to: (i) instantiate an operating system for the point of sale system and (ii) generate a set of data packets. The system also includes a discrete microcontroller communicatively coupled with the applications microprocessor and programmed to: (i) selectively operate in an unsecure mode and a secure mode; and (ii) filter, when operating in the unsecure mode, the set of data packets received from the applications microprocessor using a filter and a whitelist for the filter. The system also includes a near field communication front end communicatively coupled to the discrete microcontroller and an antenna, for transmitting a near field communication signal based on information from the set of data packets via the antenna.

30 Claims, 9 Drawing Sheets

(51) Int. Cl.
*G06Q 20/20* (2012.01)
*G06K 7/10* (2006.01)

(56) References Cited

U.S. PATENT DOCUMENTS

| | | |
|---|---|---|
| 9,721,242 B2 | 8/2017 | Bedier |
| 2008/0238610 A1 | 10/2008 | Rosenberg |
| 2011/0320293 A1 | 12/2011 | Khan |
| 2012/0254031 A1 | 10/2012 | Walker |
| 2013/0040571 A1 | 2/2013 | Wall |
| 2014/0027506 A1 | 1/2014 | Heo |
| 2014/0052532 A1 | 2/2014 | Tsai |
| 2015/0118958 A1 | 4/2015 | Jain |
| 2016/0125376 A1 | 5/2016 | Beatty |
| 2016/0260073 A1* | 9/2016 | Colnot ............ G06Q 20/202 |
| 2016/0275472 A1 | 9/2016 | Rajamannar |
| 2016/0358159 A1 | 12/2016 | Khan |
| 2018/0367541 A1* | 12/2018 | Ponnuswamy ....... H04L 63/101 |

OTHER PUBLICATIONS

NXP Semiconductors N.V., Application Note, AN11906, Starting a Product Development with PN518, Rev. 1.0, Jan. 4, 2017.
NXP Semiconductors, Product Data Sheet, CLRC663, High Performance Multi-Protocol NFC Frontend, Rev 4.4, May 2, 2017.
NXP, Application Note, AN11802, NFC Reader Library for Linux Installation Guidelines, Rev. 1.4, May 16, 2017.
NXP, Products, NFC Front End Solutions, Available at: http://www.nxp.com/products/identification-and-security/nfc-and-reader-ics/nfc-frontend-solutions:MC_41960 (Accessed on: Aug. 30, 2017).
Examination Report dated Nov. 29, 2019 from Australian Application No. 2018200864, 3 pages.
Examination Report dated Jul. 15, 2019 from Australian Application No. 2018200864, 3 pages.
Notice of Acceptance of Patent Application dated Jan. 10, 2020 from Australian Patent Application No. 2018200864 filed Feb. 6, 2018, 3 pages.

* cited by examiner

MULTI-USE NEAR FIELD COMMUNICATION FRONT END ON A POINT OF SALE SYSTEM

CROSS REFERENCE TO RELATED APPLICATIONS

The application is a continuation-in-part of U.S. patent application Ser. No. 15/698,462, filed on Sep. 7, 2017, which is incorporated by reference herein in its entirety for all purposes.

BACKGROUND

The term near field communication (NFC) refers to a type of communication that involves minute wireless data transfers between devices over limited distances. The technology is rooted in radio-frequency identification technology (RFID). NFC does not refer to a single communication specification as numerous incompatible platforms have been developed in the NFC space. These specifications include those developed by ISO/IEC, the NFC Forum, the GSMA Group, the EMV Company, and others. Furthermore, each NFC platform can include multiple modes of communication that are each individually practiced by separate devices. For example, one device could execute the NFC Forum Reader/Writer mode but not the NFC Forum Peer-to-Peer mode. The resulting technology landscape can be confusing to people who expect a device that engages in NFC communication to be able to communicate with any other device that uses NFC. However, this is not the case, and enabling a device to be interoperable with two different NFC platforms can be technically challenging.

SUMMARY

This disclosure relates to point of sale (POS) devices capable of obtaining payment information from an NFC enabled device, encrypting the payment information, and transmitting the payment information to a central processor for payment. Specifically, this disclosure relates to POS devices that can communicate via multiple NFC specifications using a single NFC front end. One of the NFC specifications can be used to obtain payment information that is processed by a first secure microprocessor while another one of the NFC specifications is used to obtain unsecure information that is processed by an applications microprocessor. Benefits associated with some of the disclosed approaches include the reduced bill of materials and design effort resulting from a reduction in the number of antennas and front-end hardware required by a single POS device, and the improved user experience associated with a device that conducts all NFC communications via a single location on the device. This disclosure includes specific technical approaches directed to enabling a POS device to communicate using multiple NFC protocols with a single NFC front end.

FIG. 1 illustrates a POS device 100 with an integrated NFC antenna 101. The POS device 100 also includes a printed circuit board 102 with an NFC controller 103 and a discrete microcontroller 104. As illustrated, POS device 100 is displaying a prompt on display 105 indicating that the terminal is primed to receive payment information via NFC antenna 101. In response to such a prompt, a customer of the merchant operating the terminal could transmit payment information to NFC antenna 101 by holding an NFC-enabled payment card 106, with an NFC antenna 107, above POS device 100. The payment information could be transmitted in accordance with the EMVCo L1 NFC specification. The POS device may be equipped to read many different NFC cards for purposes of processing payments. However, POS device 100 can also, with the same hardware elements, communicate with another NFC device using a completely different specification. For example, POS device 100 could communicate with a store card 108 with an NFC antenna 109 using a less secure NFC protocol such as that defined by the NFC Forum Reader/Writer specification or that defined by the NFC Forum NCI stack. POS device 100 can therefore obtain payment information from NFC enabled payment cards using NFC as well as communicate with low-cost NFC tags.

Approaches disclosed herein include the use of a discrete microcontroller that can selectively instantiate one of at least two different NFC stacks, where each NFC stack is tailored for a specific use. The discrete microcontroller communicates with both an NFC front end and an applications microprocessor for the POS device. The discrete microcontroller can be coupled between the NFC front end and the applications microprocessor for this purpose. The POS device operates in two different modes depending upon which of the two different NFC stacks is instantiated. The POS device can engage in communication with two different external devices via NFC using two incompatible and independent NFC protocols in the two modes. However, switching between the two modes does not require any change in the hardware along the path of communication between the external device and the applications microprocessor, and instead all that is involved is a change in the impedance of solid state devices and the use of different software.

In certain approaches, the discrete microcontroller can selectively instantiate a first NFC stack for an NFC payment processing protocol and a second NFC stack is for a less secure protocol. The terminal could be referred to as being in a payment processing mode when the first NFC stack was instantiated. In these approaches, the discrete microcontroller can also serve as a secure microprocessor for the POS device and can encrypt payment information received via the NFC front end and payment processing NFC protocol for transmission to a payments processor. The discrete microcontroller can also encrypt payment information received on the POS device from other channels such as from a contact chip card reader, a magnetic stripe reader, a personal identification number pad, an integrated touch screen, or any other channel for receiving payment information. The discrete microcontroller can also serve as the payments kernel for the POS device. In these approaches, the discrete microcontroller can be transparent to an operating system on the applications microprocessor and can tunnel data from the NFC front end to the applications microprocessor while the second stack is instantiated and the terminal is in an unsecure mode, and can receive and encrypt payment data from the NFC front end while the first stack is instantiated and the terminal is in the payment processing mode.

In certain approaches, the discrete microcontroller is rendered transparent to an NFC service on the applications microprocessor by augmenting an operating system of the applications microprocessor with a master communication service that administrates interrupts between the two NFC stacks, and sends remote procedure calls to retrieve buffered data on the discrete microcontroller. The NFC service of the operating system can be modified slightly to interoperate with the master communication service but the core of the operating system does not need to be modified.

In one approach, a POS system includes an NFC front end communicatively coupled to an antenna, a discrete microcontroller communicatively coupled with the near field communication front end, and an applications microprocessor communicatively coupled with the discrete microcontroller. The discrete microcontroller stores a first software stack for a first NFC protocol, and a second software stack for a second NFC protocol. The applications microprocessor instantiates an operating system for the POS system and a master NFC service. The discrete microcontroller is programmed to, selectively and in response to the master NFC service, instantiate: (i) the first software stack exclusive to the second software stack; and (ii) the second software stack exclusive to the first software stack. The first and second software stacks are independent. The first NFC protocol and the second NFC protocol are different and incompatible.

In one approach, additional security measures are applied to account for the use of the same antenna for secure information and unsecure information. For example, the first stack could be used for securely processing sensitive information while the second stack could be a less secure stack. The first stack could be the EMVCo L1 NFC stack used for processing payment information from payment cards. The second stack could be the NFC Forum NCI stack and be used for processing less secure information. Furthermore, the POS system could be designed such that the manufacturer of the POS device controlled the implementation of the EMVCo L1 NFC stack while third party developers were authorized to utilize the NCI stack. For example, the third-party developers could be authorized to utilize the NCI standard to allow applications developed for the operating system of the standard processor, to communicate with the NFC controller. In these approaches, additional security is warranted because otherwise third-party developers, or unscrupulous parties that have hacked the third-party software, could use the NCI stack to access information from payment cards. To counter this, the discrete microcontroller could be augmented with filtering technology to prevent the transfer of commands or data to and from the applications processor with the NFC antenna. The filtering technology could be a packet filter. The filtering technology could include a whitelist for the filter.

In another approach, a method of operating a POS system includes storing a first software stack for a first NFC protocol on a discrete microcontroller, storing a second software stack for a second NFC protocol on the discrete microcontroller, instantiating an operating system for the POS system on an applications microprocessor, instantiating a master NFC service on the applications microprocessor, and digitizing an NFC near field communication signal using an NFC front end. The method also includes, selectively processing, on the discrete microcontroller and as selected by the master NFC service, the digitized NFC signal with one and only one of the first software stack and the second software stack. The operating system controls the NFC front end solely via the master NFC service. The first NFC protocol and the second NFC protocol are different and incompatible.

In another approach, a POS system includes an NFC front end communicatively coupled to an antenna, a discrete microcontroller communicatively coupled thereto, and an applications microprocessor (applications processor) communicatively coupled to the discrete microcontroller. The discrete microcontroller stores a first software stack for a first NFC protocol, a second software stack for a second NFC protocol, and instructions to process a digitized NFC signal from the NFC front end with the first software stack. The applications processor stores instructions to instantiate an operating system for the point of sale system, instantiate a master NFC service, and transmit a remote procedure call from the master NFC service to the discrete microcontroller to switch between the first software stack and the second software stack.

In another approach, a point of sale system comprises an applications microprocessor programmed to instantiate: (i) an operating system for the point of sale system; and (ii) a master NFC service for switching the point of sale system between an unsecure mode and a secure mode. The point of sale system also comprises a discrete microcontroller communicatively coupled with the applications microprocessor and programmed to, in response to the master NFC service switching the point of sale system to the unsecure mode, filter a set of packets received from the applications microprocessor using a filter and a whitelist for the filter. The point of sale system also comprises a near field communication front end communicatively coupled between the discrete microcontroller and an antenna, for transmitting a near field communication signal based on information from the set of packets via the antenna.

In another approach, a point of sale system comprises an applications microprocessor programmed to: (i) instantiate an operating system for the point of sale system and (ii) generate a set of data packets. The point of sale system also comprises a discrete microcontroller communicatively coupled with the applications microprocessor and programmed to: (i) selectively operate in an unsecure mode and a secure mode; and (ii) filter, when operating in the unsecure mode, the set of data packets received from the applications microprocessor using a filter and a whitelist for the filter. The point of sale system also comprises a near field communication front end communicatively coupled to the discrete microcontroller and an antenna, for transmitting a near field communication signal based on information from the set of data packets via the antenna.

DETAILED DESCRIPTION

Figure 1:
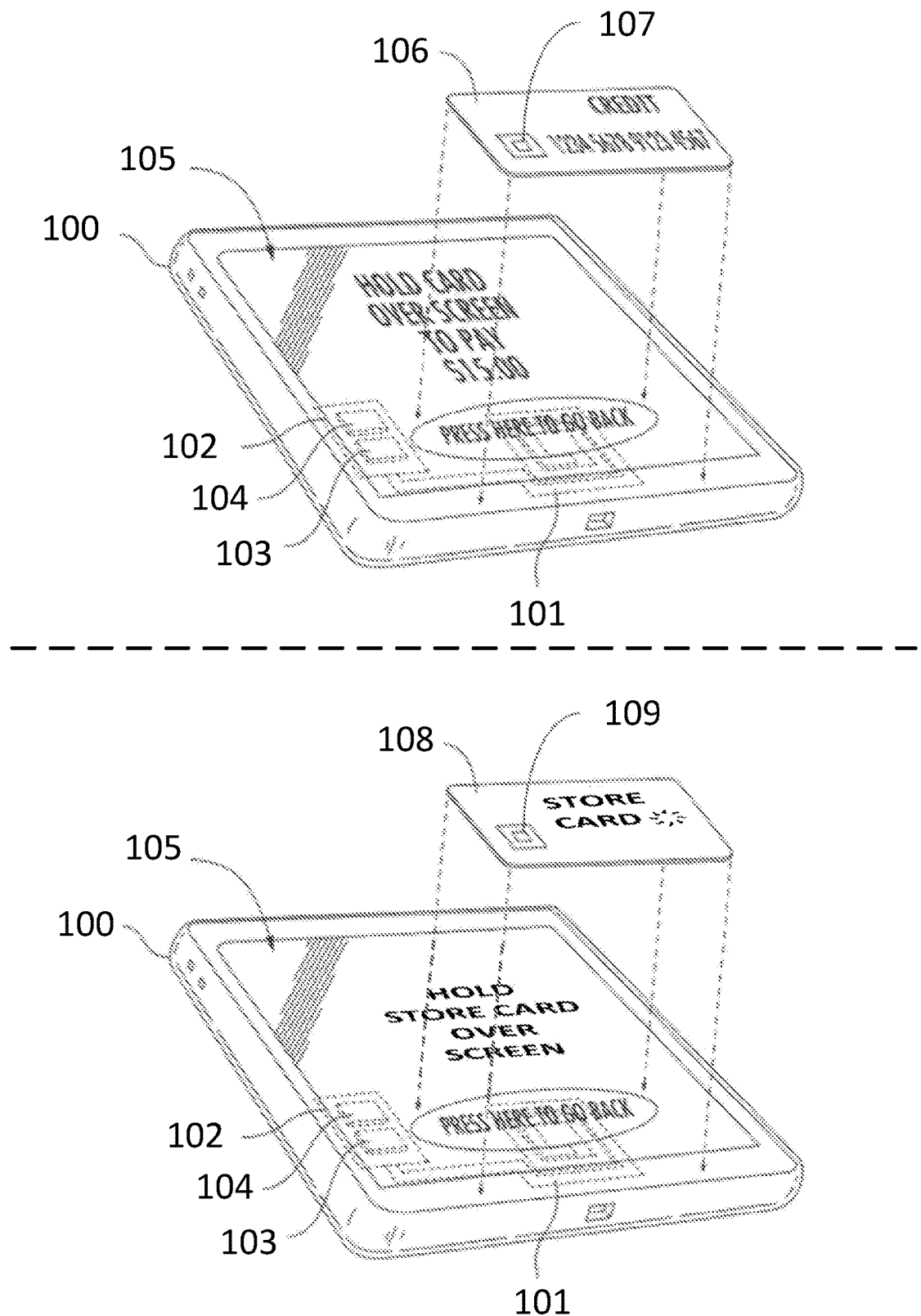
FIG. 1 illustrates a point of sale (POS) device that can communicate with both a payment card and a near field communication (NFC) tag using a single NFC frontend in accordance with some of the disclosures herein.

Methods and systems for multi-use near field communication (NFC) front ends are disclosed. An NFC front end receives signals from an antenna and conducts initial processing on the signals to condition them for use by a host system. Generally, an NFC front end includes an analog interface for connecting to an antenna (e.g., a modulator/demodulator, a phase locked loop, a filter, a transmitter, a receiver, an oscillator, an analog-to-digital converter, etc.), and a bus interface for connecting to a host (e.g., a USB, UART, SPI, or I$^2$C interface). An NFC front end can be implemented in a single integrated circuit with external connections to connect the analog interface to an external antenna, and the bus interface to an external bus. In accordance with the following approaches a single NFC front end can be used for different and incompatible NFC protocols. In particular, one of the protocols can be an NFC payment processing protocol and one of the protocols can be a basic or less secure NFC communication protocol. In further accordance with some of the following approaches, the same hardware can be used to receive payment information data from the NFC antenna of a POS system for secure processing, and tunnel other data from that same NFC antenna to an applications microprocessor of the POS system.

Approaches disclosed herein include the use of a discrete microcontroller that can selectively instantiate one of at least two different NFC stacks, where each NFC stack is tailored for a specific use. The NFC stacks can be independent software stacks. The NFC software stacks can be referred to as independent because they exist wholly in mutually exclusive physical memory locations and can individually be used to implement their protocols. As used herein, a protocol "stack" refers to a set of computer readable instructions and associated data that can be utilized by a computer to implement a low-level driver and an associated state machine which will allow the computer to talk to a different computer that operates the protocol. The discrete microcontroller can be configured such that it stores two protocol stacks in an internal or external nonvolatile memory, and instantiates a first software stack exclusive to a second software stack by loading the first software stack from memory and vice versa. The internal memory could be a nonvolatile memory such as a flash memory of the discrete microcontroller. The external memory could be a discrete flash memory on the same printed circuit board as the discrete microcontroller. The protocol stack can be instantiated on the discrete microcontroller using a bootloader or BIOS. The protocol stack could also be instantiated on the discrete microcontroller using a higher-level system, including a micro-operating system of the discrete microcontroller. The software stacks could facilitate communication protocols that utilize the same frequency when transmitting through the air between two devices. Indeed, such approaches would be beneficial in that the hardware of the NFC front end would not need to be overtly modified to facilitate communication in either mode and could be implemented with a static hardware configuration. The discrete microcontroller could selectively and alternatively instantiate either software stack to communicate in accordance with the related protocol. The discrete microcontroller could also initialize the NFC front end to be compatible with a specific NFC protocol such as by sending a signal to tune the antenna or filters of the NFC front end.

The discrete microcontroller and NFC front end can be components of a larger system. The system can be said to be operating in different "modes" when the discrete microcontroller and NFC front end are being used to process signals in accordance with different NFC protocols. In specific approaches, the discrete microcontroller could be a component of a POS system. For example, the discrete microcontroller could be a secure microprocessor for the POS system. The secure microprocessor could store encryption keys to encrypt payment information received by the POS system. The secure microprocessor could also implement a secure kernel for the POS system. The encryption keys could be stored in a secure memory on the secure microprocessor which is configured to delete the encryption keys in case of a tamper detector indicating that the POS system was undergoing a malicious physical attack. The secure microprocessor could be covered by a secure tamper mesh to prevent and detect tampering with the secure microprocessor. In a payment processing mode, payment information could be received by the NFC antenna and secure microprocessor using an NFC payment processing protocol. In an alternative mode, unsecure information could be received by the NFC antenna and secure microprocessor using a basic NFC communication protocol. The NFC payment processing protocol could be the EMV Co L1 protocol. The basic NFC communication protocol could be an NFC Forum protocol such as the NFC Forum Reader/Writer protocol or the NFC Forum NCI protocol.

In specific approaches, the disclosed hardware configuration and methods of operation will facilitate EMV compliance for the POS system because the software stack and library associated with the EMV Co L1 protocol can be stored on the discrete microcontroller in an unmodified form. As the two or more stacks on the discrete microcontroller are fully independent, and the POS system is configured to instantiate the stacks in a mutually exclusive manner, they do not need to be changed to accommodate the use of another protocol even though they both use the same front end. As will be described below, the handoff between the protocols can also be handled by a higher-level system and can be completely transparent to the two stacks. Therefore, one stack can be independently modified while another stack can remain in a certified state as recorded by a third party, such as EMV Co., and loaded into the discrete microcontroller. For example, a new updated NFC Forum Reader/Writer library drop could be integrated into the POS system without affecting a separate payment processing stack.

Figure 2:
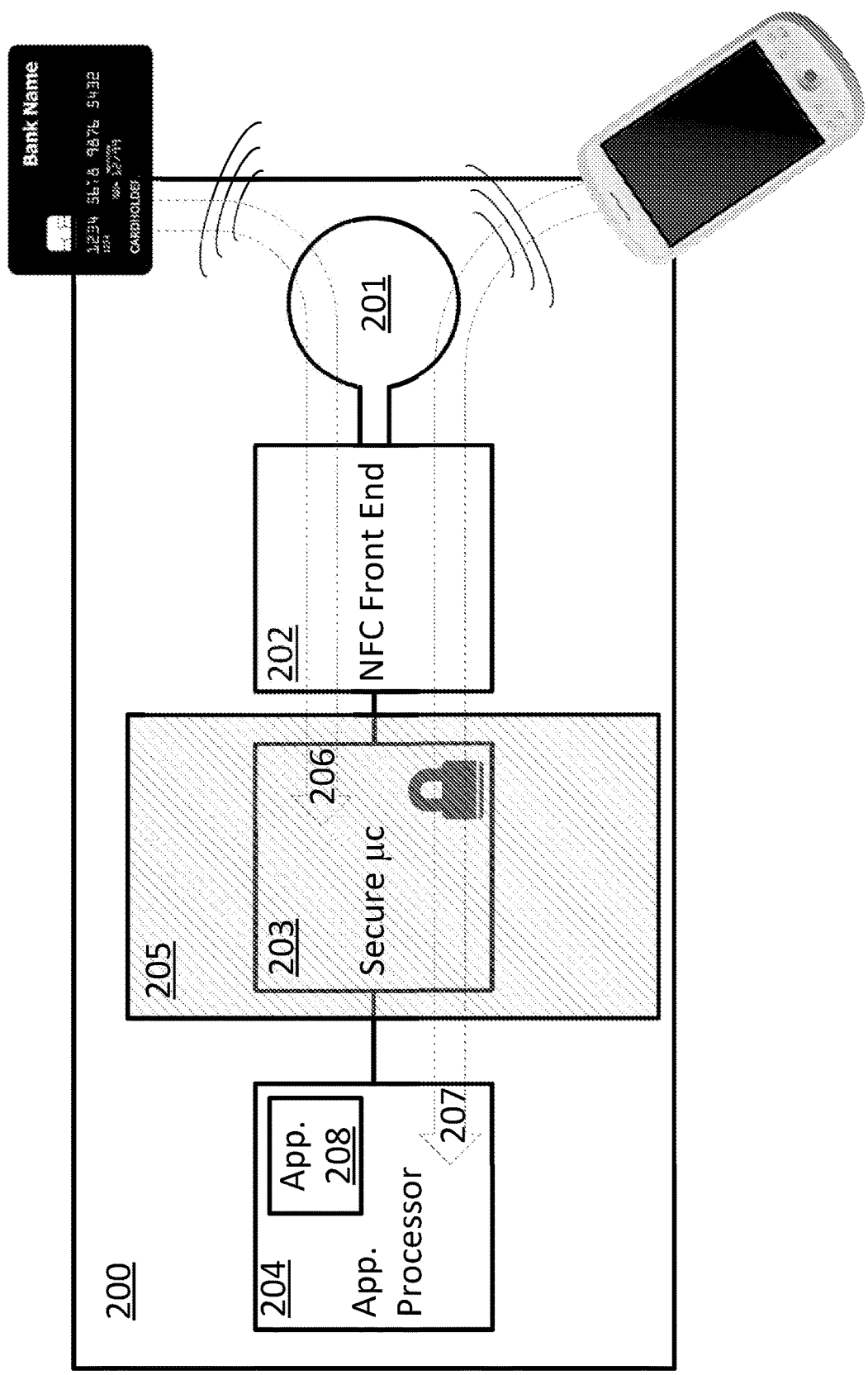
FIG. 2 illustrates a block diagram of a set of components in a POS device that uses a single NFC front end for two incompatible NFC protocols.

FIG. 2 is a block diagram 200 of the components of a POS system that utilizes a single NFC front end for two or more different NFC communication protocols. Block diagram 200 includes an antenna 201, an NFC front end 202, a discrete microcontroller 203, and an applications microprocessor 204. As illustrated, the discrete microcontroller 203 includes a secure microprocessor for the POS system and it is located within a tamper mesh 205. The NFC front end 202 can digitize incoming NFC signals received from external devices via antenna 201 and can generate NFC signals for transmission to external devices via antenna 201 based on information from applications microprocessor 204 or discrete microcontroller 203. The information can be encapsulated in packets generated by the applications microprocessor 204 or discrete microcontroller 203 in accordance with NFC protocols. The information can include requests for information or commands sent to the external devices as well as responses to those requests and commands sent from the external device.

In accordance with specific embodiments of the invention disclosed herein, the antenna 201 and NFC front end 202 can communicate with devices that operate incompatible NFC protocols. The incompatible NFC protocols that the system is designed to facilitate will be selected from a set that utilizes the same frequency as they are transmitted through the air. More generally, the protocols could still be incompatible at the physical level of the OSI model, but could utilize physical electromagnetic signals of roughly the same major characteristic. Benefits accrue to these approaches in that the hardware implementation of NFC Front End 202 and antenna 201 can be static regardless of which mode the POS system is operating in. In certain approaches, the antenna and front end can be electrically tuned for a given mode, but will remain in a static hardware configuration. Discrete microcontroller 203 can instantiate one of at least two NFC stacks and tune NFC Front End 202 to communicate with the various devices. The stacks can be instantiated by loading the stacks from nonvolatile memory into RAM. The process for loading a stack, such as the EMV Co L1 stack, from nonvolatile memory into RAM can be as fast as a few hundred milliseconds. Therefore, even in the situation where the appropriate stack is not currently instantiated when it is needed by a customer, the time it takes to instantiate the stack is negligible compared to an acceptable level of latency for a typical customer point of sale experience involving NFC.

Discrete microcontroller 203 can selectively instantiate a first software stack for a first NFC protocol or a second software stack for a second NFC protocol. The two stacks can be instantiated exclusive to the alternative stack. While instantiating either stack, discrete microcontroller 203 could buffer data received from NFC Front End 202 until applications microprocessor 204 requested the data. The first protocol could be for an NFC payment processing protocol and the second could be a less secure or basic NFC communication protocol such as an NFC tag reader protocol. In such situations, discrete microcontroller 203 could additionally encrypt payment information received from the NFC Front End 202 before sending it on to applications microprocessor 204 or sending it to a payment processor directly. The payment processor could be a network-accessible remote payment processor. The encryption process could involve the use of payment keys such as those generated by a DUKPT key management scheme. As such, discrete microcontroller 203 could store a DUKTP key set and could also store additional keys or certificates. Discrete microcontroller 203 could include a secure kernel for all the computation and functionality provided by the POS system. Discrete microcontroller 203 could be configured to delete its keys and certificates if tamper mesh 205 was disrupted or any other sensor in the system indicated that a tamper had occurred.

Applications microprocessor 204 could be the master processor of the POS system. Applications microprocessor 204 could instantiate an operating system, such as an Android Operating System or an equivalent, and run applications with the operating system such as a main register application for the POS system. The operating system could include services such as an NFC service. If the operating system were Android, the NFC service could be the Android NFC service. Applications microprocessor 204 could also instantiate a master NFC service. The master NFC service could be instantiated using firmware. The firmware could be loaded using a BIOS or bootloader. The firmware could be loaded from an internal or external nonvolatile memory.

The Applications microprocessor 204 could include installed applications 208 for increasing the utility of the POS system. The installed applications could be developed by third parties (i.e., not by the merchant-operator of the POS system or the manufacturer of the POS system). If the operating system was the Android Operating System, the applications could be Android applications. The installed applications could include payroll, inventory management, loyalty program, coupon program, and other types of applications. Some of these installed applications could require information from NFC devices through antenna 201. For example, a loyalty program application may need a loyalty program customer identifier from a tap of a customer's phone, and a coupon application may need a coupon code from a specialized reusable NFC coupon tag. The applications could interface with the NFC front end 202 for purposes of receiving information from and/or sending information to external NFC devices. The applications could interface with the NFC front end 202 via the NFC service of the operating system, while the master NFC service could be transparent to the installed applications 208. As a result, applications would not need to be custom designed to operate with a system in accordance with FIG. 2.

The master NFC service could render discrete microcontroller 203 transparent to the operating system of applications microprocessor 204 by handling the transitions between the various NFC operating modes for the operating system and allowing the discrete microcontroller to tunnel data to the applications processor when the POS system is operating in an unsecure mode. The master NFC service could achieve this with the use of direct communication with both the NFC service of applications microprocessor 204 and the kernel or operating system of discrete microcontroller 203. Direct communication could be utilized to accept commands from and deliver data to the NFC service and to provide commands to and deliver data to and from the discrete microcontroller. The discrete microcontroller 203 could selectively instantiate one of its stored software stacks in response to the master NFC service.

The two arrows overlying the components of FIG. 2 illustrate the flow of data through the diagram in two modes of operation for the POS system. In a payment processing mode, data flows from a device having payment information, such as the illustrated NFC-enabled payment card, along data flow line 206. In an alternative or unsecure mode, data flows from a device having less sensitive information for transmission, such as the illustrated smartphone in NFC-tag emulation mode, along data flow line 207. The smartphone could include an application used to track loyalty points or some other non-payment related application that interacts with a point of sale system. Data flow line 206 could include processing on discrete microcontroller 203 using an NFC payment processing protocol after discrete microcontroller 203 had instantiated a first software stack for that protocol. The processed payment data could then be encrypted on the discrete microcontroller 203 and subsequently sent to applications microprocessor 204 for transmission through a network to a payments processor, or directly to the payments processor via a direct network connection to discrete microcontroller 203. Data flow line 207 could include processing on discrete microcontroller 203 using a basic NFC communication protocol using the second software stack. The processed information could then be tunneled to the applications microprocessor 204. The processed information could ultimately be provided to an installed application 208.

The switch over required for the POS system to facilitate data flow line 206 as opposed to data flow line 207 could be limited to a change in which software stack was instantiated by discrete microcontroller 203. In certain approaches, the switch could also involve a nominal change in NFC Front End 202 and antenna 201 such as electrically tuning the filter or changing the impedance of solid state devices in either block of the diagram.

The connections between the blocks in block diagram 200 are illustrated as generic single line connections. As illustrated, discrete microcontroller 203 could be connected to NFC front end 202 using a single connection such as a USB, SPIO, UART, or $I^2C$ bus. However, the communication can occur on multiple lines between the blocks. For example, applications microprocessor 204 and discrete microcontroller 203 could be connected using two separate external buses such as a USB line and a UART line. Based on the application 208 running on applications microprocessor 204, one of the lines could entirely block the other line such that the two elements in the block diagram were connected by two totally separate channels. However, the connection between applications microprocessor 204 and discrete microcontroller 203 could also be provided via a single channel.

Communication between the applications microprocessor 204, discrete microcontroller 203, and NFC front end 202 could be conducted through external buses. The buses could be wires or traces on a printed circuit board. The external buses could route signals between the devices such that the devices were thereby communicatively coupled. Communications between applications microprocessor 204 and discrete microcontroller 203 could be conducted using inter-processor lines. Discrete microcontroller 203 could include a buffer for temporarily storing data that is meant to be tunneled through to applications microprocessor 204 until applications microprocessor 204 sends a request for the data. All of the devices in block diagram 200 could be located on the same printed circuit board and all inter-block lines could be provided by traces on that printed circuit board. Furthermore, the difference between data flow line 206 and the portion of data flow line 207 that terminates at discrete microcontroller 203 can involve the same physical routing at the board or system level of the diagram. In specific embodiments of the invention, the unsecure mode mentioned herein can involve the POS system allowing information from the NFC antenna to follow data flow paths that continue on to the applications processor such as data flow line 206, and the secure mode mentioned herein can involve the POS system causing information from the NFC antenna to follow data flow paths that are held for encryption by the discrete microcontroller such as data flow line 207.

Figure 3:
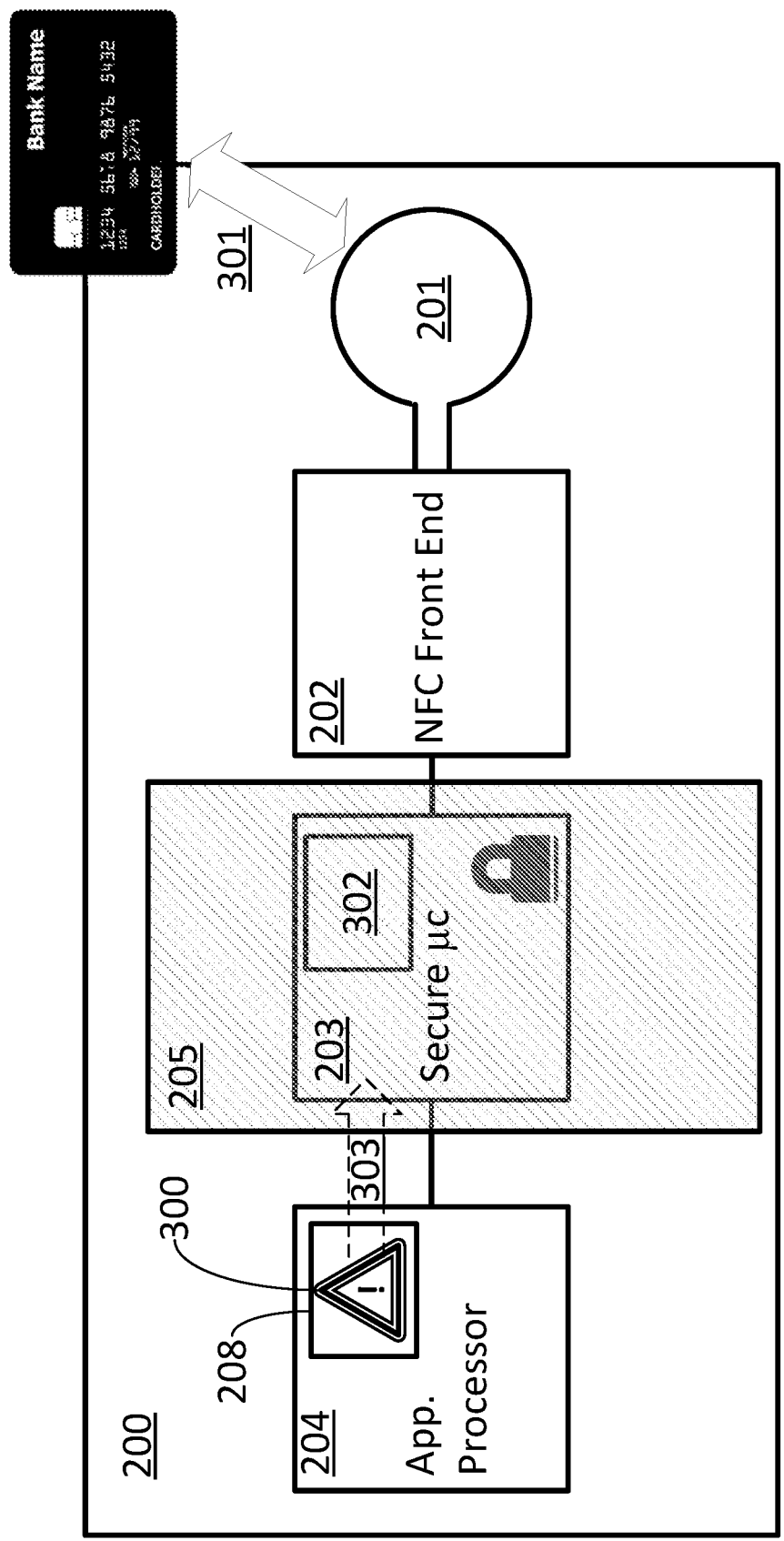
FIG. 3 illustrates a block diagram of how a filter on the discrete microcontroller in FIG. 2 could prevent the illicit retrieval of payment information from a payment card when the POS device is operating in an unsecure mode.

FIG. 3 is another illustration of block diagram 200 which can be used to describe additional security measures that can be applied to account for the use of the same antenna for secure information and unsecure information. In specific embodiments of the invention, a POS system operating in a secure mode will instantiate a first stack on discrete microcontroller 203 for processing payment information from NFC-enabled payment devices received on antenna 201, and will instantiate a second stack on discrete microcontroller 203 for conducting operations with non-payment NFC devices on antenna 201. The unsecure mode can be used to allow applications, such as application 208, to have access to NFC functionality via device antenna 201 and the second stack. However, since information on data flow line 206 can continue all the way through to the applications processor in the unsecure mode, care must be taken to assure that data from an NFC-enabled payment device is not inadvertently accessed by the applications 208 if the device is brought into proximity 301 of antenna 201 while the device is in the unsecure mode.

In specific embodiments of the invention, care must be taken with applications 208 having access to antenna 201. Specifically, the applications may be compromised with malicious software 300 specifically designed to illegally obtain payment information. These compromised applications could then cause packets 303 to be transmitted to the discrete microcontroller for purpose of obtaining payment card information or conducting other unscrupulous operations involving the delivery of commands to and the retrieval of information from, a secure external NFC device. For example, the packet could be an EMV command packet such as SELECT (AID) with the AID being the address of a payment card account number. It is important for these packets to not reach the NFC device as they could lead to the unauthorize exposure of information. Furthermore, regardless of the possibility of intentional hacking of applications 208, errors in the application code or packet data could lead to a similar situation. In either situation, the packets should not be delivered to the payment card.

To prevent the unauthorized access of payment card data while the device is operating in an unsecure mode, the discrete microcontroller could be augmented with filtering technology. In FIG. 3, the filtering technology is illustrated as a module 302 instantiated on the discrete microcontroller 203. The module 302 could include a filter and a whitelist for the filter. The module could be a code module instantiated when data was received by the discrete microcontroller. The module could be part of a remote procedure call sent from the applications processor to instruct the discrete microcontroller to transmit information via the NFC antenna. The filter could be a packet filter. The filter could be a broad filter used to filter out any packets generated by applications microprocessor 204 and received at discrete microcontroller 203 that included specific commands or addresses. The whitelist could allow packets that would otherwise have been filtered out by the filter to nevertheless pass through the discrete microcontroller 203. Packets from a set of packets generated by applications microprocessor 204 that are not filtered could be delivered to NFC front end 202 to allow the NFC front end 202 to produce a near field communication signal based on the information in the packets. Packets from the set of packets generated by applications microprocessor 204 that are filtered out could be deleted. The process of deleting the packet could be accompanied by preparing a filter report for transmission to a POS network operator or the manufacturer of the POS system. The process of preparing the report could include making a copy of the packet for inclusion in the report. The packet could be packaged and quarantined for this purpose. Regardless, the filtered packets would be blocked by the filter and would not continue on to the NFC front end for conversion into an NFC signal.

In specific embodiments of the invention in which the filter is a packet filter, the packet filter could be configured to analyze and filter packets based on the information contained in the packet, the type of packet, information in the header of the packet, the address of the packet, a command type associated with the packet, and a variety of other factors. In general, the filter can be a broad filter that prevents the transmission of any commands that can request payment data from the NFC device or otherwise place the device in a condition in which the payment data is more likely to be accessible. The filter can be instantiated when the unsecure mode is activated or can be continuously instantiated and only act to filter when the unsecure mode is activated. The filter can be implemented as a remote procedure call on the discrete microcontroller. The remote procedure call can be a call for sending data from the applications microprocessor for transmission by the NFC antenna. The filtering action of the remote procedure call could involve allowing the data to be delivered to the kernel of the discrete microcontroller if it is not filtered and taking no action if the data is filtered (thereby effectively blocking the data from transferring further toward the NFC antenna). In specific embodiments of the invention, the call can be generated by the master NFC service and can contain the data for transmission via NFC.

The filter could be based on a set of addresses common to any NFC protocol utilized for payments. NFC protocols that are otherwise incompatible are generally still regulated under higher level standards that can be utilized to formulate filter criteria that will be common across all the protocols that might share an antenna such as antenna 201. The filter criteria could be address prefixes associated with payment information addresses on NFC-enabled devices. For example, in specific embodiments, the POS systems disclosed herein may utilize incompatible NFC protocols that all commonly utilize application identifiers (AIDS) in compliance with ISO/IED 7816-5. In this example, the filter could be based, at least in part, on a list of ISO/IEC 7816 registered application identifier prefixes. In specific embodiments, the list of AID prefixes could be: 0xA00, 0x00, 0xA4, and 0x04. In a specific embodiment, any packet including these addresses could be filtered out. The high-level prefixes could be selected to encompass every AID associated with a payment device. The filter could be broad as a result, and many non-payment card AIDS will lead to false-positive filtering events.

The filter could be based on a set of commands common to the payment card protocols the POS system is configured to operate with. If the POS system was configured to interoperate with multiple contactless payment device protocols, the commands could be drawn from each of the various protocols. Commands for payment devices that the device was not configured to operate with would already be filtered, in a sense, due to the fact that the device would not be inherently configured to generate those commands. For example, if the NFC Front End was compatible with EMVCo protocols, the filter could filter out any packet including the following EMV commands: SELECT PSE, SELECT PPSE, GET PROCESSING OPTIONS, and SELECT (X). In this example, the "X" could be a list of addresses. The addresses could be the AIDS mentioned in the preceding paragraph such as: 0xA00, 0x00, 0xA4, and 0x04. For refence, SELECT PSE and SELECT PPSE are both commands that request a list of AIDS supported by the NFC device, GET PROCESSING OPTIONS provides a list of communication protocols the NFC device will support, and the SELECT (X) command prepares a specific address "X" on the NFC device for communication in the sense that selecting a file in a standard operating system opens the file to allow for transfer of information into and out of the file. Again, the filter can be made over-inclusive to ensure that all payment device communications are blocked. However, this broad filtering will also filter out many non-payment devices. As such, whitelisting technology can be deployed to allow a merchant to provide functionality with these specific non-payment devices.

The whitelist can be based on numerous factors. For example, the whitelist could effectively cancel the filtering operation for: certain combinations of commands and addresses, entire commands that were otherwise filtered, or any command with a specific address. The whitelist could be based on a set of AIDS. In specific embodiments of the invention, where the broad filter is based on address prefixes, the whitelist could be based on suffixes in the same address system. In specific embodiments of the invention the whitelist could be based, at least in part, on a list of ISO/IEC 7816 registered application identifier suffixes. For example, the filter could be based on a set of ISO/IED 7816-5 compliant prefixes and the whitelist could be a set of suffixes in that AID system and within the range of filtered prefixes. The suffixes could be added to the whitelist to allow the applications processor to communicate with specific NFC devices that have AIDS with prefixes that would otherwise be filtered and whitelisted suffixes. In a specific implementation, the filter could include the list of AID prefixes: 0xA00, 0x00, 0xA4, and 0x04, and the whitelist could include suffixes to allow YubiKey and FIDO° compliant non-payment NFC cards to be read in the unsecure mode. As such, the whitelist would be configured to allow requests in prefixes 0xA00, 0x00, 0xA4, and 0x04 with suffixes of 0x05 and 0x27 for YubiKey and 0x06 and 0x47 for FIDO®. The whitelist could simply be a list of these suffixes.

The whitelist can be implemented and maintained in various ways. The whitelist can be set by a manufacturer of the POS system. The whitelist can also be expanded globally by request of application developers, or on a merchant-operator basis at request of those merchant-operators. The manufacturer of the POS system could be capable of expanding the whitelists of all POS systems owned by a given merchant-operator via a network connection in response to those requests. In specific embodiments, the party conducting those actions will be a POS network administrator. The POS network administrator and the POS manufacturer can be, but are not necessarily, the same entity.

In specific embodiments, the whitelist could be hard-coded onto the secure processor. The hard coding could be decided and conducted by the manufacture of the POS system at the time of manufacture such that the device was deployed with the whitelist built in. The whitelist could be stored in a nonvolatile memory and instantiated by the discrete microcontroller every time the device was turned on. The nonvolatile memory could be covered by tamper mesh 205. The whitelist could be stored in the same memory used for the first and second software stacks or for the cryptographic keys mentioned elsewhere if the discrete microcontroller included those.

In specific embodiments, the applications microprocessor 204 could be configured to modify and update the whitelist through the course of the device's normal use. Although this may seem like it reintroduces a security vulnerability, care can be taken to assure that applications such as application 208 are not capable of updating the whitelist. For example, each POS system could have a single secure service for communicating with the discrete microcontroller. The single secure service could be located at an apex of the authority hierarchy in the applications processor and POS system. In another example, only commands accompanied by a certificate signed by the main register applications of the applications processor could be found valid for purposes of updating the whitelist. In another example, the certificate could be signed by a server responsible for managing a network of POS devices. Only updates properly signed by the server as detected by the secure processor would be allowed to be applied to update the whitelist. In other example, a secret key held by the server and the secure processor could be used to send encrypted updates to the whitelist down to the secure processor from a server. The updates could be administrated by a POS network administrator. For example, a request could be received from a merchant-operator of the POS system who was interested in using certain non-payment related POS systems. The request could be analyzed by the POS network administrator to determine if an AID associated with the request was not also associated with a payment device, and the list could be updated via a network connection if it was found to be an acceptable addition to the whitelist. In the same fashion, the POS network administrator could remove entries from the whitelist if industry standards were modified to associate payment information with whitelisted entries.

In specific embodiments of the invention, a POS network administrator could maintain separate whitelists for groups of merchant-operators, each of which operated a network of POS terminals. Each merchant-operator could be associated with a whitelist stored by the manufacturer. The secure service mentioned above could be tasked with pulling the whitelist from the server using an identifier for the merchant-operator associated with the POS system, and injecting the data into the discrete microcontroller. Third party applications, such as applications 208, on the POS system could make a request to whitelist, which would start the above process after a review was conducted to make sure the address wasn't associated with a payment device, but the third party applications would not have control over the updating service. In this way, various customer-merchants can have different whitelists which are updated across their own POS networks from a central location.

The following is a sample code written in C that can be used to instantiate a specific embodiment of the filter and whitelist of module 302. The code is being provided for explanatory purposes as an illustration of code that can be used with specific embodiments of the invention disclosed herein. The code could be compiled into a binary file for storage in a memory accessible to the discrete microcontroller for purposes of instantiating the filter. The code could be instantiated as part of a remote procedure call. In this case, the remote procedure call could be an OS_NFC_Write_RPC meaning the operating system of the applications processor is providing information to be written via NFC. Sentences set off by double slashes are comments indicating the operation of the code in plain language. In the illustrated case, the filter is for any use of the following commands: PSE AID, PPSE AID, GET PROCESSING OPTIONS, and for SELECT commands using the following prefixes: 0x00, 0xA4, 0x04, 0x00. The whitelist in this example is designed to allow for use of YubiKey and FIDO® NFC devices.

```c
// The following defines variables equal to the binary data associated with the filter criteria.
// SELECT PSE AID
    const char pse_aid[ ] = {0x31, 0x50, 0x41, 0x59,0x2E, 0x53, 0x59, 0x53, 0x2E, 0x44, 0x44,
    0x46, 0x30, 0x31};
// SELECT PPSE AID
    const char ppse_aid[ ] = {0x32, 0x50, 0x41, 0x59,0x2E, 0x53, 0x59, 0x53, 0x2E, 0x44,
    0x44, 0x46, 0x30, 0x31};
// GET PROCESSING OPTIONS COMMAND
    const char gpo_cmd[ ] = {0x80, 0xA8, 0x00, 0x00};
// PAYMENT CARD AID PREFIX
    const char pay_card_aid_prefix[ ] = {0xA0, 0x00, 0x00};
// SELECT CMD PREFIX
    const char select_cmd_prefix[ ] = {0x00, 0xA4, 0x04, 0x00};
// The following is the whitelist. It defines variables equal to the binary data associated with
// AID suffixes for the whitelisted NFC communication devices.
    const char yubikey_suffix[ ] = {0x05, 0x27};
    const char fidoaid_suffix[ ] = {0x06, 0x47};
// The following is the code for the filter and whitelist. It is all inside an if statement that checks
// to make sure the unsecure mode is active. The variable in_ptr is a pointer for the input data
// from the OS_NFC_Write_RPC remote procedure call. The filter is run once per call.
    if(unsecure_active( )) {
// The following obtains the AID from in_ptr.
        u8 *in_ptr = (u8 *)in;
        char *aid_ptr = memmem(in_ptr, in_size, pay_card_aid_prefix,
        sizeof(pay_card_aid_prefix));
// The following filters SELECT PSE and SELECT PPSE command
        if(memmem(in_ptr, in_size, pse_aid, sizeof(pse_aid)) != NULL) {
// Input data is a SELECT PSE command. Input is filtered by doing nothing.
        } else if(memmem(in_ptr, in_size, ppse_aid, sizeof(ppse_aid)) != NULL) {
// Input data is a SELECT PPSE command. Input is filtered by doing nothing.
// The following filters all SELECT commands unless the address is on whitelist
        } else if (aid_ptr != NULL) {
                char *select_ptr = aid_ptr - 5;
                char *aid_suffix = aid_ptr + 3;
            if((aid_suffix != NULL) &&
                ((memcmp(aid_suffix, yubikey_suffix, sizeof(yubikey_suffix)) == 0) | |
                (memcmp(aid_suffix, fidoaid_suffix, sizeof(fidoaid_suffix)) == 0))) {
// SELECT commands for whitelisted addresses are passed through by being written to the
discrete microcontroller.
                    simHandleWriteInterrupt(0, in_ptr, in_size);
            } else if ((select_ptr != NULL) &&
                (memcmp(select_ptr, select_cmd_prefix, sizeof(select_cmd_prefix)) == 0)) {
// Input data is a SELECT command for a blocked address and address was not on whitelist.
Input is filtered by doing nothing.
```

```
        } else {
// The following allows that data to pass through. The AID was found, but it was not in a
SELECT command.
            simHandleWriteInterrupt(0, in_ptr, in_size);
                }
// The following filters GET PROCESSING OPTIONS commands.
        } else if (memmem(in_ptr, in_size, gpo_cmd, sizeof(gpo_cmd)) != NULL) {
// Input data is a GET PROCESSING OPTIONS command. Input is filtered by doing nothing.
        } else {
                    simHandleWriteInterrupt(0, in_ptr, in_size);
// All commands that have not been filtered are passed through by being written to the discrete
microcontroller.
            }
        }
    }
```

In the example above, the filtering mechanism is limited to allowing YubiKey and Fido AIDS for sake of explanation, but it can be expanded to whitelist more AIDS. The code snippet could be compiled into a binary file and then flashed onto the discrete microcontroller for storage. The binary file could also be stored in nonvolatile memory accessible to the discrete microcontroller. The nonvolatile memory and discrete microcontroller could each be located within a tamper mesh. The binary file could then be recalled from memory to instantiate the filter and whitelist for the filter.

Figure 4:
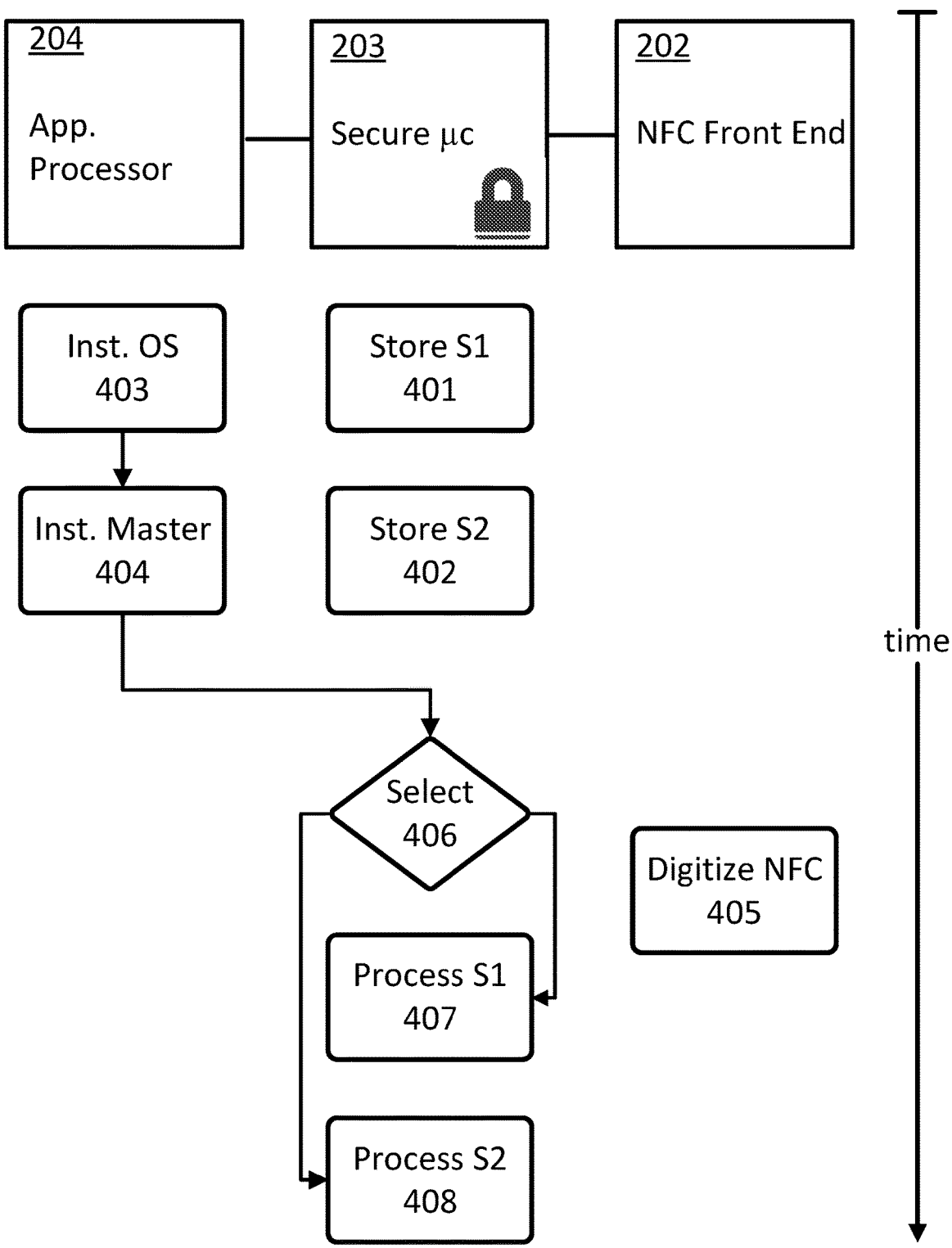
FIG. 4 illustrates a flow chart for a set of methods that allow a POS device to communicate using two different NFC protocols using a single NFC front end.

FIG. 4 includes a flow chart 400 of a set of methods for operating a POS system that uses a single NFC front end for at least two NFC protocols. The methods are disclosed with reference to the POS components of FIG. 2. Steps located below a POS component in FIG. 4 are conducted by that POS component. The steps are provided in chronological order descending the page.

Steps 401-4 are conducted prior to the execution of step 406. In step 401, a first software stack for a first NFC protocol is stored on discrete microcontroller 203. In step 402, a second software stack for a second NFC protocol is stored on discrete microcontroller 203. Although these two steps are shown as sequential in chronological order, these steps can be conducted in any order so long as they are completed before step 406 and can involve the software stacks mentioned above. At least one of the software stacks can be provided by an authorized payment processing standardization entity and can be loaded into discrete microcontroller 203 in an unmodified original form. Prior or subsequent to the execution of steps 401 and 402, a step 403 of instantiating an operating system for the POS system can be executed on applications microprocessor 204. The operating system can be an Android Operating System or equivalent. The operating system can be used to instantiate a main register application for the POS system that is used by a merchant to interact with the POS system. The operating system can also be used to instantiate supporting applications for the POS system such as a loyalty point tracker, merchant payroll application, and other applications that increase the functionality of the device. The operating system can also be used to instantiate services for the operating system such as in step 404 when the operating system is used to instantiate a master NFC service on the applications microprocessor.

The master NFC service that is instantiated in step 404 can be instantiated by loading the service from firmware on the point of sale device. The master NFC service could be an additional service that is programmed into the applications microprocessor by a POS manufacture after the applications microprocessor was purchased. The master NFC service could be configured to render discrete microcontroller 203 transparent to the operating system on applications microprocessor 204. This approach allows the secure processor to be the first device to receive payment data from the NFC front end in case the applications processor is compromised while at the same time requiring minimum changes to an applications processor architecture that is designed to connect directly to an NFC controller and front end. The master NFC service could communicate with the operating system's NFC service and hide the complexities of interfacing with multiple NFC protocols from the operating system. The operating system's NFC service may be modified slightly in order to communicate with the master NFC service.

The master NFC service could receive requests from applications on the applications processor via the built in NFC service of the operating system to alter the NFC protocol currently being used to communicate on the POS device. For example, an application on the POS system could be triggered by a user which required communication with an NFC tag such as a loyalty tracking system or some other application. The request could be used by the operating system to change the protocol being instantiated by the secure microcontroller. Prior to the NFC front end digitizing an NFC communication signal as in step 405, the master NFC service could execute a step 406 of selecting a software stack to instantiate on the discrete microcontroller. The digitized NFC signal could then be selectively processed using either the protocol provided by the first software stack as in step 407 or the second software stack as in step 408 depending upon which software stack was instantiated on discrete microcontroller. Furthermore, the master NFC service could be configured to time multiplex the two protocols by repeating step 406 and alternating between the two stacks in accordance with a predetermined time interval.

Figure 5:
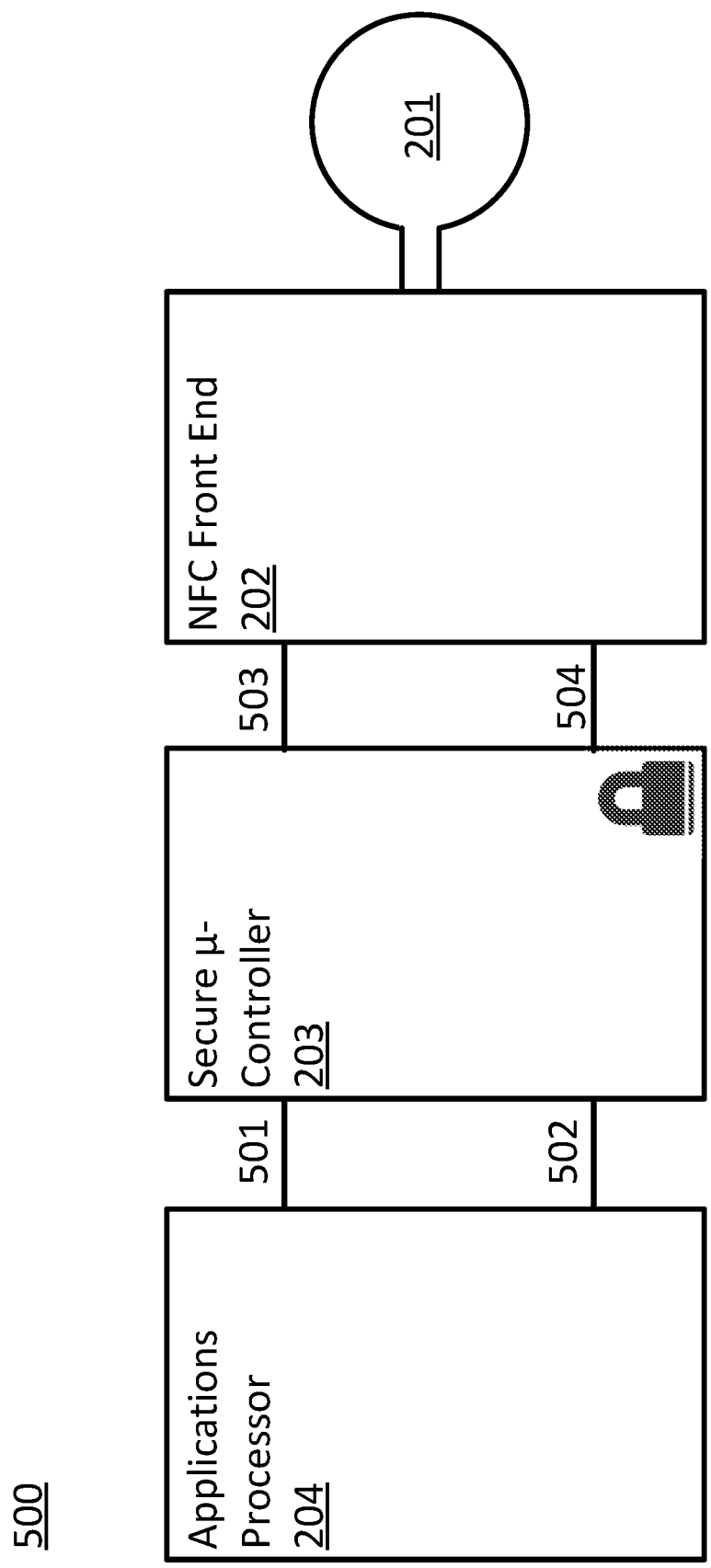
FIG. 5 illustrates a block diagram of a set of components in a POS device that uses a single NFC front end for two incompatible NFC protocols with an emphasis on the physical connections between the components.

The switching mechanism used to transition the POS system between different modes and the manner in which the NFC communication service can render the discrete microcontroller transparent to the operating system can be described with reference to FIGS. 5-9. The elements of block diagram 500 in FIG. 5 are similar to those of block diagram 200 in FIG. 2 and like components are labeled using the same reference numbers. However, block diagram differs as to the illustrated connections between the components. Again, the connections can be implemented by buses, interprocessor lines, cables, and traces on a printed circuit board. In particular, line 501 could be a GPIO bus, line 502 could be a USB, line 503 could be a data bus, and line 504 could be an SPIO bus. The connections will be referred to during the discussion of the ladder diagrams on FIGS. 6-9. In FIGS. 6-9, the first NFC protocols could be the EMV Co L1 protocol and the second NFC protocol could be the NFC Forum Reader/Writer protocol.

A POS system in accordance with the approaches disclosed herein can be programmed to implement many potential varieties for how a mode control switch is initiated. For example, mode control could be initiated on the applications processor side of the POS terminal via a request for NFC processing by an application instantiated by the operating system. As another example, mode control could be initiated on the NFC Front End or discrete microcontroller side in response to detecting information associated with a given protocol in an incoming NFC signal. If the NFC front end or discrete microcontroller detected payment information in an incoming NFC signal, the POS system could immediately switch to a payment processing mode. If any software stack on the discrete microcontroller detected a failed communication, the POS terminal could automatically switch to a different mode to retry the communication with a different protocol. As another example, the POS system could be configured to switch into a time multiplexing mode control state where the NFC front end was continually transitioned between modes with different associated NFC communication protocols to detect if a communication via that particular NFC communication protocol was currently required. Furthermore, the POS systems can utilize different varieties for mode switching based on whether they are transitioning into or out of a given mode. For example, one mode could be favored such that the associated NFC protocol was always allowed to finish before switching out of the mode, and alternative protocols would always be immediately interrupted when switching into the mode. The POS systems could be configured to favor a payment processing mode and its associated payment processing protocol over other modes. As another example, the POS system could be in a payment processing mode by default and only transition out of that mode temporarily when a request to do so was received.

Figure 6:
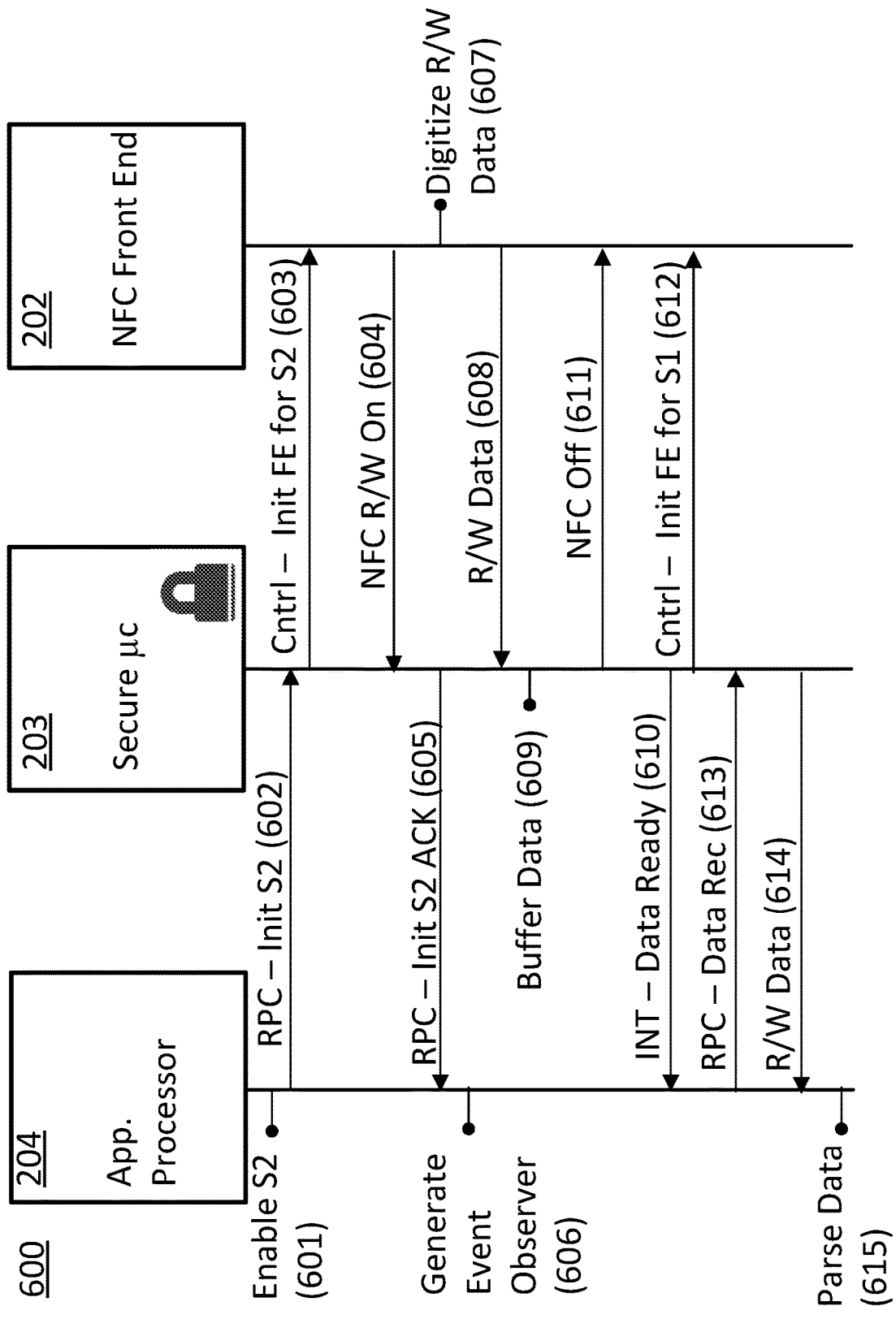
FIG. 6 illustrates a ladder diagram for a set of methods executed by the components of FIG. 5 in which an NFC Forum Reader/Writer protocol is used to obtain data from an external device.

FIG. 6 includes a ladder diagram 600 for a method of controlling the switch over between different modes in a POS system. The two modes are associated with two different software stacks for two different NFC protocols. In this example, the first NFC protocol could be a payment processing protocol and the second NFC protocol could be an NFC Form Reader/Writer protocol. At the top of ladder diagram 600 the device is operating in a payment processing mode with a first software stack instantiated on discrete microcontroller 203. Ladder diagram 600 begins with step 601 of enabling a second software stack via an application on applications microprocessor 204. The application can be a loyalty program application running on applications microprocessor 204 that is requesting information from a user's store card with an integrated NFC tag. In step 602, the applications processor sends this update to the discrete microcontroller using a master communication service on applications microprocessor 204. The master communication service could be the only system on applications microprocessor 204 that directly communicates with discrete microcontroller 203. The master communication service triggers a remote procedure call (RPC) to tell discrete microcontroller 203 to instantiate the second software stack for a second NFC protocol. The remote procedure call can be sent on USB 502. Discrete microcontroller 203 can then conduct a step 603 in which a signal is sent to NFC front end 202 to initialize the front end for the second NFC protocol. NFC front end 202 could then send an acknowledgement to discrete microcontroller 203 in a step 604 to confirm that the front end is configured for the second protocol. Discrete microcontroller 203 could then send a response to the remote procedure call in a step 605 to inform applications microprocessor 204 that the front end is initialized for the second protocol. Applications microprocessor 204 could then generate an event observer in a step 606 to await a signal that the data from the second protocol is available.

After the front end is initialized it could begin to receive data via the NFC antenna and digitize data received in accordance with the Reader/Writer protocol in a step 607. The digitized data could then be transferred to the discrete microcontroller 203 in a step 608. The data could then be buffered on discrete microcontroller 203 in a step 609. Discrete microcontroller 203 could then send an interrupt to applications microprocessor 204 to indicate that the data was ready as in step 610. The interrupt could be sent on GPIO bus 501 and could be detected by the event observer generated in step 606. Discrete microcontroller 203 could also send an optional signal to the NFC front end to power down the antenna and front end in a step 611 to save power. Alternatively, discrete microcontroller 203 could send a signal to the NFC front end to initialize for operation with the first protocol in a step 612. This step could be used in a situation in which the POS terminal was configured to operate in the first mode by default.

The data from the second operating mode could ultimately be delivered to applications microprocessor 204 via a second remote procedure call using the master communication service to request the data from discrete microcontroller 203 in a step 613. The second remote procedure call could originate with the NFC service of the operating system of applications microprocessor 204. The master communication service would issue this request after processing the interrupt informing the service that the data was available in step 610. The data could be returned in a step 614. Finally, the data could be parsed and broadcast to any applications that had registered with the operating system of applications microprocessor 204 to receive the data in a step 615. In a specific approach, the same application that lead to the execution of step 601 could be an application that was registered to receive the data. Finally, step 612 of reinitializing the front end for the first protocol could be conducted at a later time after the antenna had been off for a certain amount of time such that both steps 611 and 612 were executed. Step 612 could also be accompanied by discrete microcontroller 203 reinstantiating the first software stack.

Figure 7:
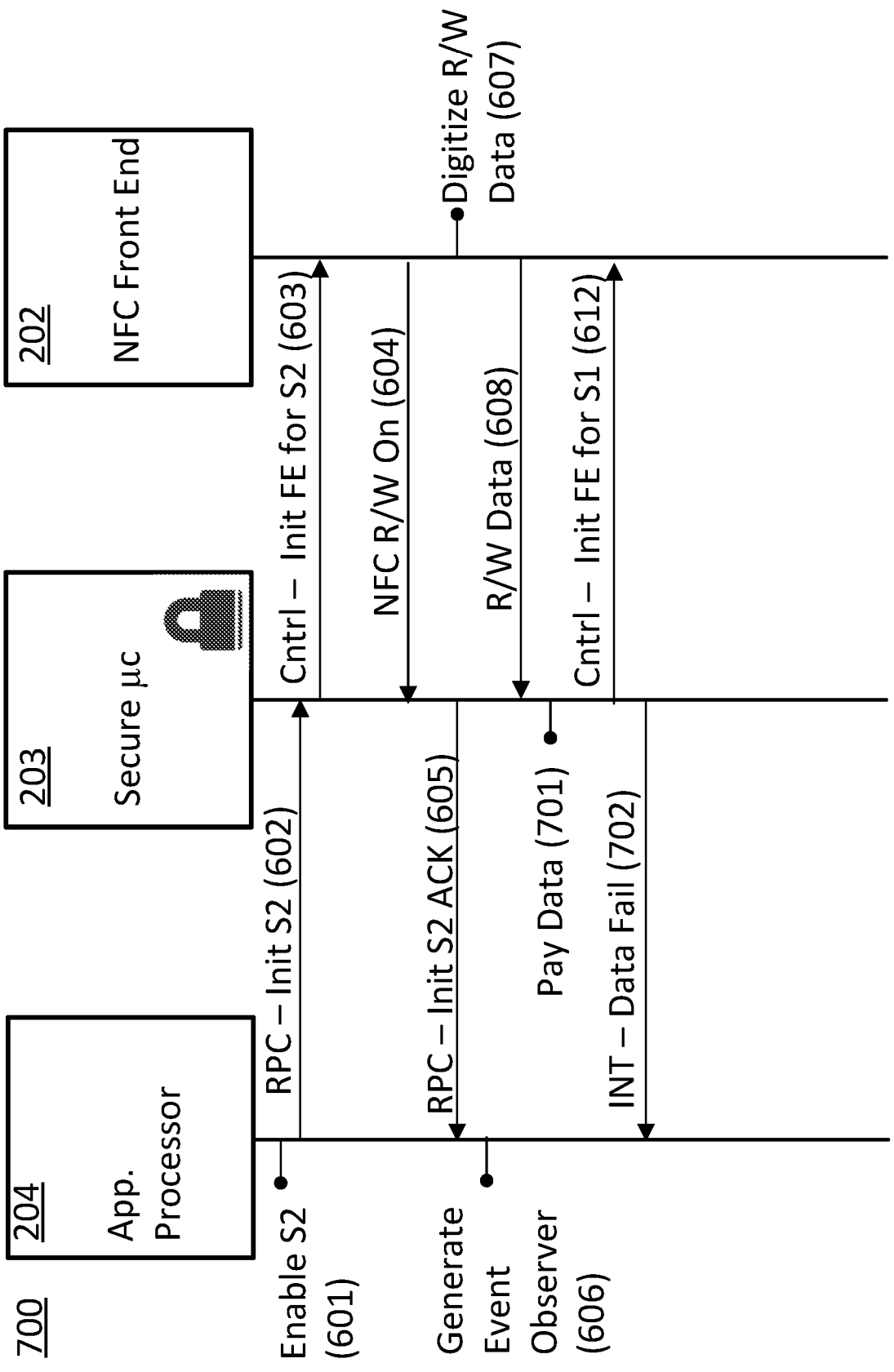
FIG. 7 illustrates a ladder diagram for a set of methods executed by the components of FIG. 5 in which an NFC Forum Reader/Writer protocol is interrupted by the detection of payment data.

FIG. 7 includes a ladder diagram 700 for a method of controlling the switch over between different modes in a POS system. Like steps in diagram 700 are labeled with like reference numbers from FIG. 6. Ladder diagram 700 differs it that it illustrates one way in which the POS system can favor a first NFC protocol over a second NFC protocol. For example, the POS system could favor a payment processing NFC protocol over a more basic or unsecure NFC protocol. The timing of the payment processing NFC protocol could be constrained more tightly than the timing of the alternative NFC protocol. In this example, the first NFC protocol could be a payment processing protocol and the second NFC protocol could be an NFC Form Reader/Writer protocol. As with FIG. 6, the request for the second protocol will be acknowledged, and the process will continue all the way through step 608. However, in the illustrated variant, payment data is detected in the data being read by the discrete microcontroller in a step 701. As the processing of payment data is favored, the discrete microcontroller could send a data fail interrupt to applications microprocessor 204 in a step 702. The interrupt could be received by the event observer generated in step 606. Applications microprocessor 204 would then wait until a later time to send another remote procedure call while discrete microcontroller conducted step 612 to allow for processing of the payment data in accordance with the first NFC protocol.

Figure 8:
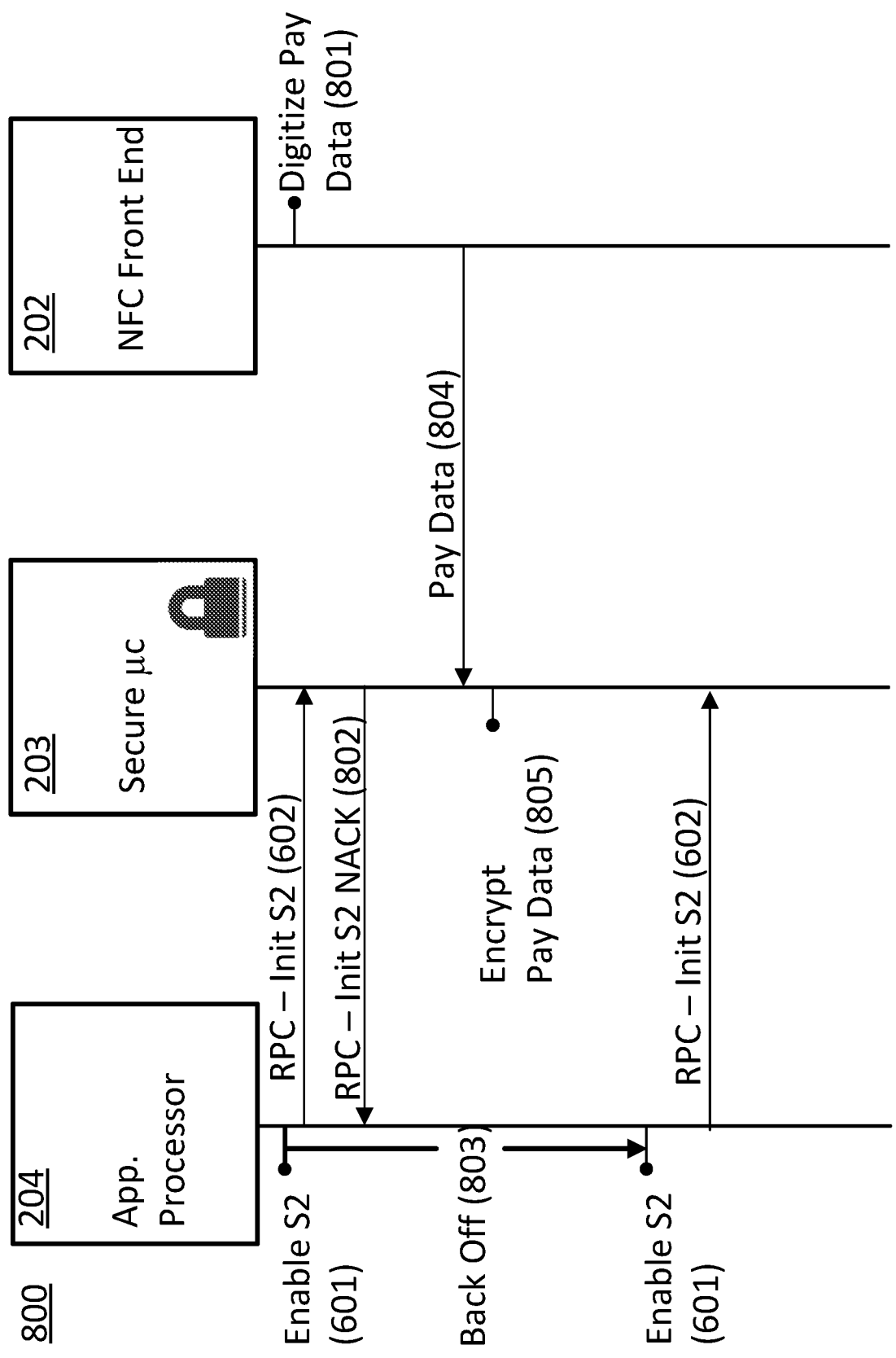
FIG. 8 illustrates a ladder diagram for a set of methods executed by the components of FIG. 5 in which an NFC Forum Reader/Writer protocol is denied due to the ongoing execution of an NFC payment processing protocol.

FIG. 8 includes a ladder diagram 800 for a method of controlling the switch over between different modes in a POS system. Like steps in diagram 800 are labeled with like reference numbers from FIG. 6. Ladder diagram 800 differs it that it illustrates one way in which the POS system can favor a first NFC protocol over a second NFC protocol. For example, the POS system could favor a payment processing NFC protocol over a more basic or unsecure NFC protocol. The timing of the payment processing NFC protocol could be constrained more tightly than the timing of the alternative NFC protocol. In this example, the first NFC protocol could be a payment processing protocol and the second NFC protocol could be an NFC Form Reader/Writer protocol. In the illustrated example, the first NFC protocol is actively conducting a communication session and the front end is digitizing payment data in a step 801. As such, and since the first NFC protocol is favored, the request for initializing the second software stack associated with the second NFC protocol in step 602 will be answered by a negative acknowledgment in step 802. In this variant, the remaining steps of ladder diagram 600 would not be executed and the applications processor would wait until a later time to send another remote procedure call. Specifically, applications microprocessor 204 would wait for a preprogrammed back off period 803 before repeating steps 601 and 602. The back off period could be set proportional to the average time required to conduct a payment processing routine. As such, discrete microcontroller 203 would have time to receive payment information from NFC front end 202 in a step 804, and encrypt the payment information in a step 805, prior to receiving a subsequent remote procedure call from applications microprocessor 204. The back off period could also be configured to increase on further iterations if a subsequent remote procedure call received a negative acknowledgement.

Figure 9:
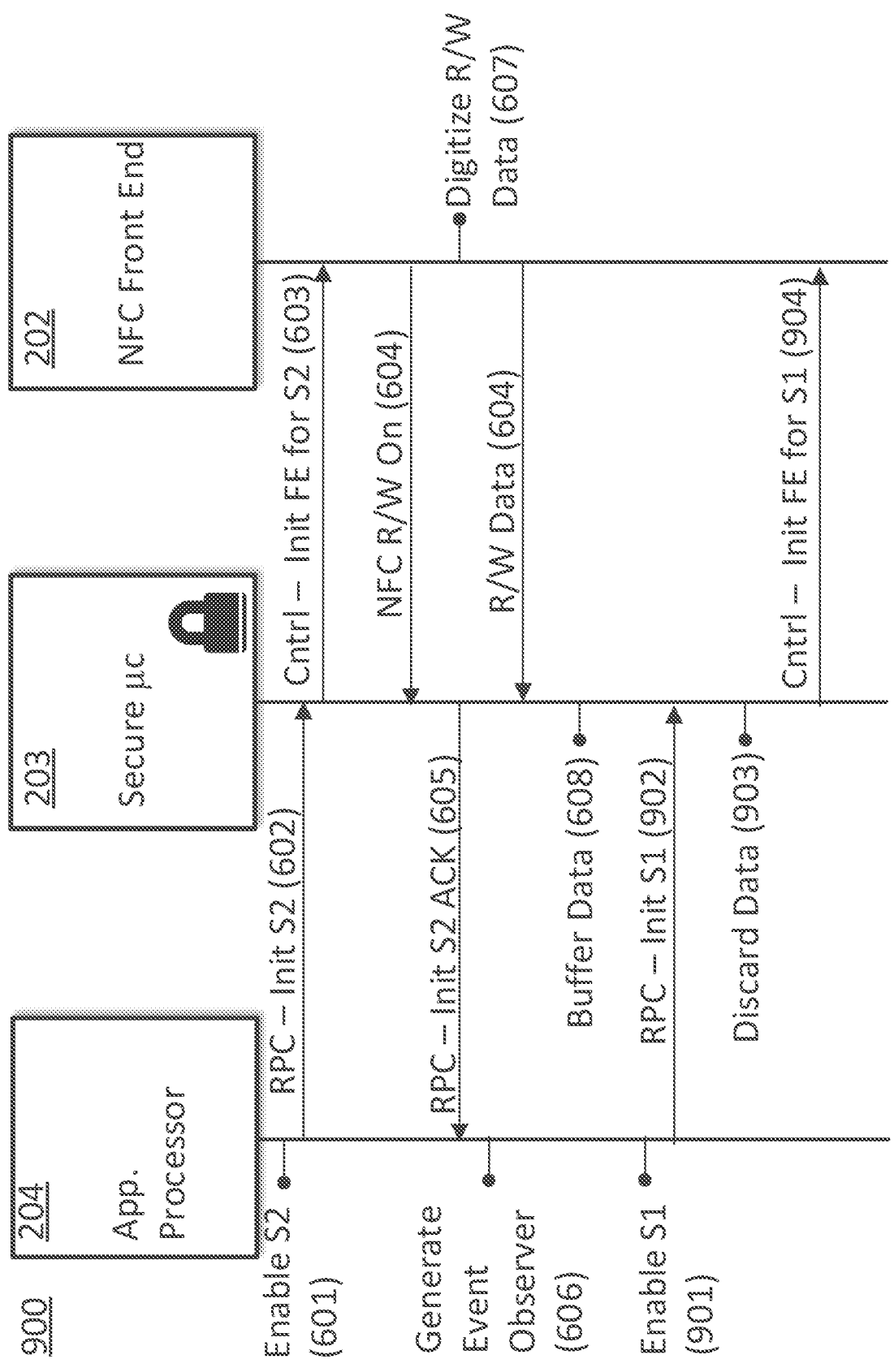
FIG. 9 illustrates a ladder diagram for a set of methods executed by the components of FIG. 5 in which an NFC Forum Reader/Writer protocol is interrupted by the execution of an NFC payment processing protocol.

FIG. 9 includes a ladder diagram 900 for a method of controlling the switch over between different modes in a POS system. Like steps in diagram 900 are labeled with like reference numbers from FIG. 6. Ladder diagram 900 differs it that it illustrates one way in which the POS system can favor a first NFC protocol over a second NFC protocol. For example, the POS system could favor a payment processing NFC protocol over a more basic or unsecure NFC protocol. The timing of the payment processing NFC protocol could be constrained more tightly than the timing of the alternative NFC protocol. In this example, the first NFC protocol could be a payment processing protocol and the second NFC protocol could be an NFC Form Reader/Writer protocol. In ladder diagram 900, steps 601-608 are conducted as in ladder diagram 600. However, in a step 901, an application on applications microprocessor 204 will request the initialization of a first NFC communication mode or data that can only be obtained via said mode. As a result, the master communication service on applications microprocessor 204 may generate a remote procedure call to instantiate the first software stack on discrete microcontroller 203 in a step 902. In response, and because the illustrated approach favors the first mode over the second mode, the data that has been buffered in discrete microcontroller 203 in step 608 is discarded in a step 903. The discrete microcontroller will then also instantiate the first software stack and send a control signal to NFC front end 202 to initialize the front end for the first NFC protocol in a step 904. The event observer generated in step 606 can subsequently time out or receive a negative response from discrete microcontroller 203.

The approaches described with reference to FIG. 6-9 can be augmented with various additional aspects. For example, the use of time multiplexing between different modes of operation can be applied to assure that the appropriate protocol is being applied to communicate with alternative devices. Indeed, the default mode of operation for the device could involve an interleaved operation of the different NFC protocols on the device. In these situations, each stack on the discrete microcontroller would run for a specific time slot and then turns off to handover the control to another other stack. If one of the stacks was a payment processing protocol, this could increase the latency, but the merchant experience would be seamless. Also, if any communication between NFC front end and an external device fails, a different protocol can be selected at random or based on any information that was obtained during the failed communication, to complete the communication session with the external device. Any of the control signals described in the ladder diagrams can be sent to the NFC front end on SPIO bus 504 and data can be sent between the two blocks on data bus 503. Any of the interrupts sent from discrete microcontroller 203 to applications microprocessor 204 in the ladder diagrams could be sent on GPIO bus 501 and any data sent between the two blocks can be sent on USB 502.

The specific example of a dual-use NFC front end that is capable of being used to process NFC tags in an NFC read/write mode and also to process payments using the EMVCo L1 standard is used throughout this disclosure as a non-limiting example of the approaches that are disclosed herein. However, the approaches disclosed herein can be utilized to make use of the same NFC front end for multiple communications protocols. Furthermore, the approaches disclosed herein can be utilized for any kind of short range wireless communications technology and radio frequency identification (RFID) communication protocols including ISO/IEC 14443, JIS-X 6319-4, ISO/IEC 18092, EMVCo specifications, any NFC Forum specification (e.g. NFC-A, NFC-B, NFC-F), and any contactless card technology specification generally.

While the specification has been described in detail with respect to specific embodiments of the invention, it will be appreciated that those skilled in the art, upon attaining an understanding of the foregoing, may readily conceive of alterations to, variations of, and equivalents to these embodiments. Any of the method steps discussed above can be conducted by a processor operating with a computer-readable non-transitory medium storing instructions for those method steps. The computer-readable medium may be a memory within a personal user device or a network accessible memory. Although examples in the disclosure were generally directed to a device configured to operate with two different protocols, the approaches could be directed to a device configured to operate with any number of different protocols so long as the NFC front end could be tuned to receive electromagnetic signals in accordance with the OSI physical level of that protocol. These and other modifications and variations to the present invention may be practiced by those skilled in the art, without departing from the scope of the present invention, which is more particularly set forth in the appended claims.

What is claimed is:

1. A point of sale system comprising:
    an applications microprocessor programmed to instantiate: (i) an operating system for the point of sale system; and (ii) a master NFC service for switching the point of sale system between an unsecure mode and a secure mode;

a discrete microcontroller communicatively coupled with the applications microprocessor and programmed to, in response to the master NFC service switching the point of sale system to the unsecure mode, filter a set of packets received from the applications microprocessor using a filter and a whitelist for the filter; and a near field communication front end communicatively coupled between the discrete microcontroller and an antenna, for transmitting a near field communication signal based on information from the set of packets via the antenna.

2. The point of sale system of claim 1, further comprising:
a tamper mesh that covers the discrete microcontroller;
a nonvolatile memory covered by the tamper mesh; and
wherein the whitelist for the filter is stored on the nonvolatile memory.

3. The point of sale system of claim 2, wherein:
the applications microprocessor is further programmed to update the whitelist for the filter by transmitting a command from the applications microprocessor to the discrete microcontroller.

4. The point of sale system of claim 1, wherein:
the whitelist is hard coded on the discrete microcontroller.

5. The point of sale system of claim 1, wherein:
the whitelist is based, at least in part, on a list of ISO/IEC 7816 registered application identifier suffixes.

6. The point of sale system of claim 1, further comprising:
an installed application on the applications microprocessor; and
wherein the set of packets: (i) are produced by the operating system and master NFC service; and (ii) are based on function calls from the installed application.

7. The point of sale system of claim 1, wherein:
the near field communication front end is programmed to digitize an incoming near field communications signal received on the antenna; and
the digitized incoming near field communication signal is processed by the discrete microcontroller in the secure mode; and
the discrete microcontroller tunnels the digitized incoming near field communication signal through to the applications microprocessor in the unsecure mode.

8. The point of sale system of claim 1, further comprising:
a first software stack, for a first near field communication protocol, stored on the discrete microcontroller;
a second software stack, for a second near field communication protocol, stored on the discrete microcontroller;
wherein the near field communication front end digitizes an incoming near field communication signal received on the antenna;
wherein the discrete microcontroller is programmed to, selectively and in response to the master NFC service, instantiate: (i) the first software stack exclusive to the second software stack to process the digitized incoming near field communication signal; and (ii) the second software stack exclusive to the first software stack to process the digitized incoming near field communication signal;
wherein the first and second software stacks are independent; and
wherein the first near field communication protocol and the second near field communication protocol are different and incompatible.

9. The point of sale system of claim 8, wherein:
the first software stack and the second software stack are stored in a nonvolatile memory on the discrete microcontroller;
the first software stack is for a near field communication tag read/write protocol;
the second software stack is for a payment processing protocol; and
the discrete microcontroller stores a set of encryption keys for the point of sale system.

10. The point of sale system of claim 8, wherein:
the first near field communication protocol and the second near field communication protocol both utilize ISO/IEC 7816 application identifiers.

11. The point of sale system of claim 8, wherein:
the second software stack is for the EMVCo level 1 payment card protocol; and
the point of sale system is an EMV compliant system.

12. The point of sale system of claim 8, wherein:
the discrete microcontroller includes a secure processor;
the near field communication front end is communicatively coupled with the discrete microcontroller via a trace on a printed circuit board;
the applications microprocessor and the discrete microcontroller are discrete devices on the printed circuit board; and
the discrete microcontroller is covered by a tamper mesh.

13. A method for operating a point of sale system comprising:
instantiating, using an applications microprocessor, an operating system for the point of sale system and a master NFC service;
switching the point of sale system between an unsecure mode and a secure mode using the master NFC service;
filtering a set of packets received from the applications microprocessor, on a discrete microcontroller and in response to the master NFC service switching the point of sale system to the unsecure mode, using a filter and a whitelist for the filter;
generating a near field communication signal based on the set of packets using a near field communication front end coupled between the discrete microcontroller and an antenna; and
transmitting the near field communication signal using the antenna.

14. The method of claim 13, further comprising:
storing the whitelist for the filter in a nonvolatile memory;
wherein a tamper mesh covers the discrete microcontroller; and
wherein the nonvolatile memory is covered by the tamper mesh.

15. The method of claim 14, further comprising:
transmitting a command to update the whitelist from the applications microprocessor to the discrete microcontroller; and
updating the whitelist on the discrete microcontroller in response to the command.

16. The method of claim 13, wherein:
the whitelist is hard-coded on the discrete microcontroller.

17. The method of claim 13, wherein:
the whitelist is based, at least in part, on a list of ISO/IEC 7816 registered application identifier suffixes.

18. The method of claim 13, further comprising:
receiving a function call from an installed application on the applications microprocessor; and
producing, using the operating system and master NFC service, the set of packets based on the function call.

19. The method of claim 13, further comprising:

digitizing, using the near field communication front end, a near field communications signal received on the antenna;

processing the digitized near field communication signal using the discrete microcontroller in the secure mode; and tunneling the digitized near field communication signal through the discrete microcontroller to the applications microprocessor in the unsecure mode.

20. The method of claim 13, further comprising:

storing, on the discrete microcontroller, a first software stack for a first near field communication protocol;

storing, on the discrete microcontroller, a second software stack for a second near field communication protocol;

digitizing, using the near field communication front end, an incoming near field communication signal received on the antenna;

selectively and in response to the master NFC service, instantiate: (i) the first software stack exclusive to the second software stack to process the digitized incoming near field communication signal using the discrete microcontroller; and (ii) the second software stack exclusive to the first software stack to process the digitized incoming near field communication signal using the discrete microcontroller;

wherein the first and second software stacks are independent; and wherein the first near field communication protocol and the second near field communication protocol are different and incompatible.

21. The method of claim 20, wherein:

the first software stack and the second software stack are stored in a nonvolatile memory on the discrete microcontroller;

the first software stack is for a near field communication tag read/write protocol;

the second software stack is for a payment processing protocol; and the discrete microcontroller stores a set of encryption keys for the point of sale system.

22. The method of claim 20, wherein:

the first near field communication protocol and the second near field communication protocol both utilize ISO/IEC 7816 application identifiers.

23. The method of claim 20, wherein:

the second software stack is for the EMVCo level 1 payment card protocol; and the point of sale system is an EMV compliant system.

24. The method of claim 20, wherein:

the discrete microcontroller includes a secure processor;

the near field communication front end is communicatively coupled with the discrete microcontroller via a trace on a printed circuit board;

the applications microprocessor and the discrete microcontroller are discrete devices on the printed circuit board; and the discrete microcontroller is covered by a tamper mesh.

25. A point of sale system comprising:

an applications microprocessor programmed to: (i) instantiate an operating system for the point of sale system and (ii) generate a set of data packets;

a discrete microcontroller communicatively coupled with the applications microprocessor and programmed to: (i) selectively operate in an unsecure mode and a secure mode; and (ii) filter, when operating in the unsecure mode, the set of data packets received from the applications microprocessor using a filter and a whitelist for the filter; and a near field communication front end communicatively coupled to the discrete microcontroller and an antenna, for transmitting a near field communication signal based on information from the set of data packets via the antenna.

26. The point of sale system of claim 25, wherein:

the applications microprocessor is further programmed to update the whitelist for the filter by transmitting a command from the applications microprocessor to the discrete microcontroller.

27. The point of sale system of claim 25, wherein:

the whitelist is hard coded on the discrete microcontroller.

28. The point of sale system of claim 25, wherein:

the filter is based, at least in part, on a list of ISO/IEC 7816 registered application identifier prefixes; and the whitelist is based, at least in part, on a list of ISO/IEC 7816 registered application identifier suffixes.

29. The point of sale system of claim 25, wherein:

the near field communication front end is programmed to digitize an incoming near field communications signal received on the antenna;

the digitized near field communication signal is processed by the discrete microcontroller in the secure mode; and the discrete microcontroller passes the digitized near field communication signal through to the applications microprocessor in the unsecure mode.

30. The point of sale system of claim 25, further comprising:

a first software stack, for a first near field communication protocol, stored on the discrete microcontroller;

a second software stack, for a second near field communication protocol, stored on the discrete microcontroller;

wherein the near field communication front end digitizes an incoming near field communication signal received on the antenna;

wherein the discrete microcontroller is programmed to selectively instantiate: (i) the first software stack exclusive to the second software stack to process the digitized incoming near field communication signal when the point of sale system is operating in the unsecure mode; and (ii) the second software stack exclusive to the first software stack to process the digitized incoming near field communication signal when the point of sale system is operating in the secure mode;

wherein the first and second software stacks are independent; and wherein the first near field communication protocol and the second near field communication protocol are different and incompatible.

* * * * *